Inventor:
Tracy V. Buckwalter,
By Chas. N. Butler
Attorney.

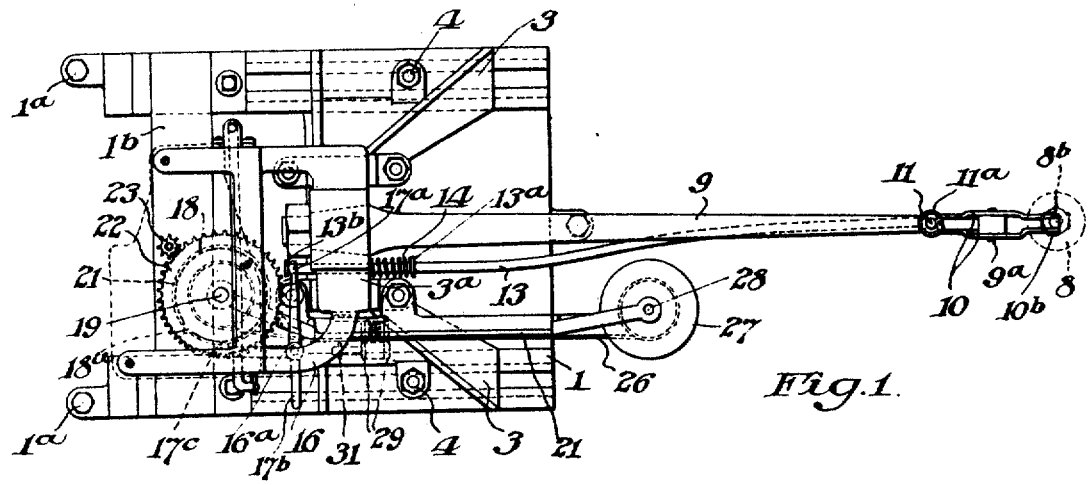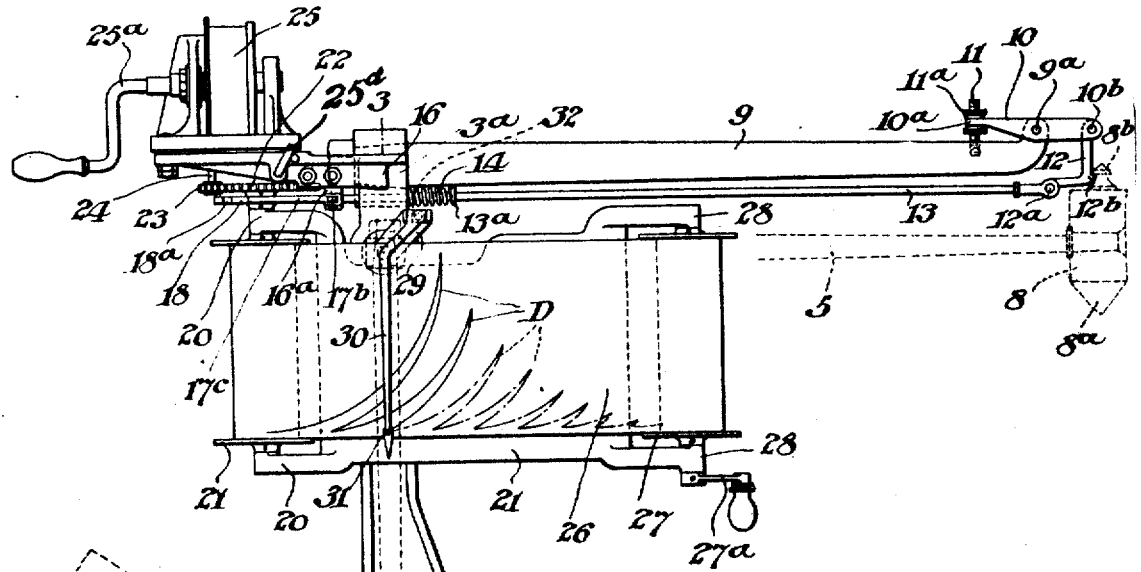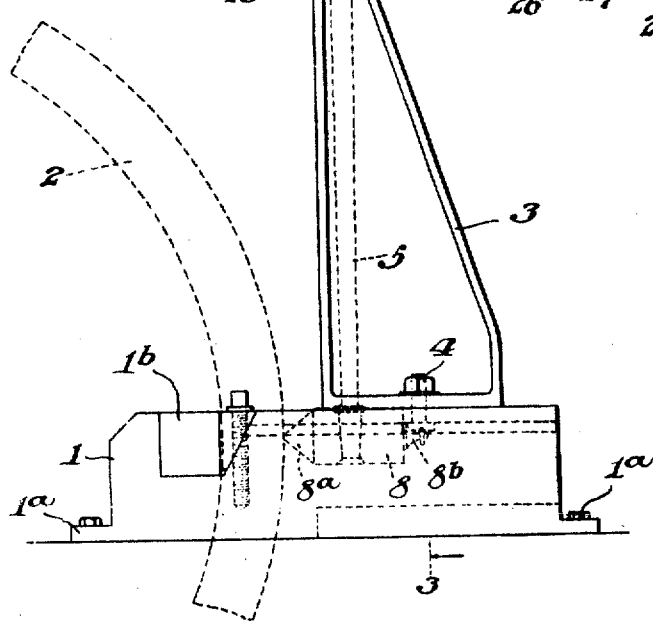

UNITED STATES PATENT OFFICE.

TRACY V. BUCKWALTER, OF ALTOONA, PENNSYLVANIA.

TESTING-MACHINE.

1,240,416.　　　　　Specification of Letters Patent.　　Patented Sept. 18, 1917.

Application filed October 17, 1916. Serial No. 126,073.

*To all whom it may concern:*

Be it known that I, TRACY V. BUCKWALTER, a citizen of the United States, residing at Altoona, in the county of Blair and State of Pennsylvania, have invented an Improved Testing-Machine, of which the following is a specification.

This invention is a testing machine designed especially for determining the hardness, elasticity and resiliency of rubber tires, but it will be understood that it is adapted to general use and is not intended to be limited to the specific purpose stated.

In its preferred form, my improved testing machine comprises an oscillatory device provided with a striker (generally having a conical contacting part) adapted for indenting the object to be tested, in combination with automatically tripped means for holding the device in elevated position from which it falls against the object to be tested and recording means by which the rebounds of the device are charted so that the characteristics of the tested objects are graphically indicated and can be compared.

A primary object of my invention is to provide simple, convenient and efficient means for marking objects to be tested by striking them with a tool having a definite character and force, as also for charting the characteristic qualities of such objects.

The nature and advantages of my improvements will be fully understood from the following description and the accompanying drawings in illustration thereof.

Figure 3:
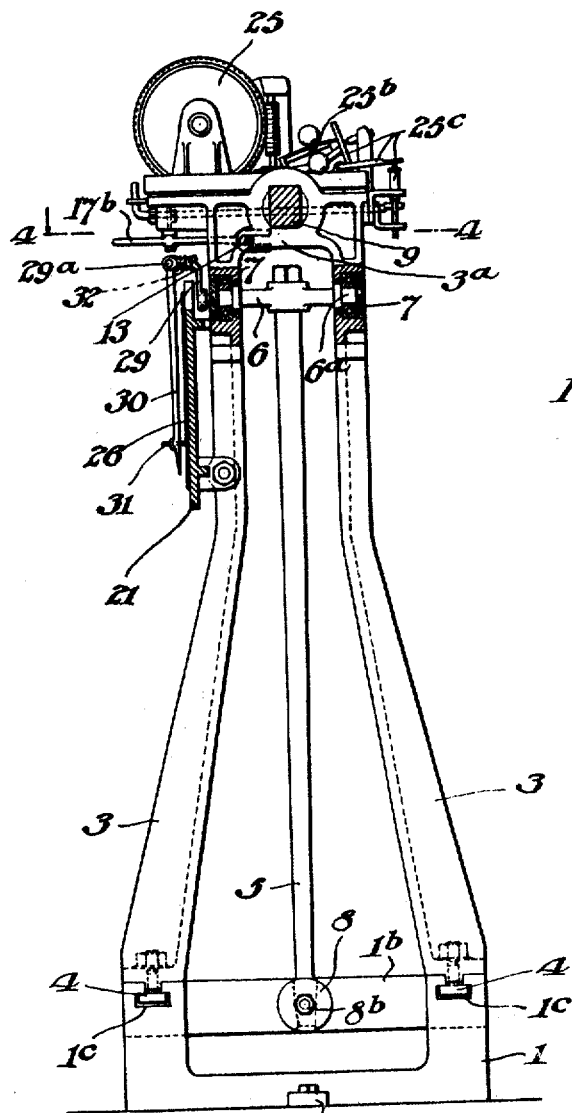
Figure 4:
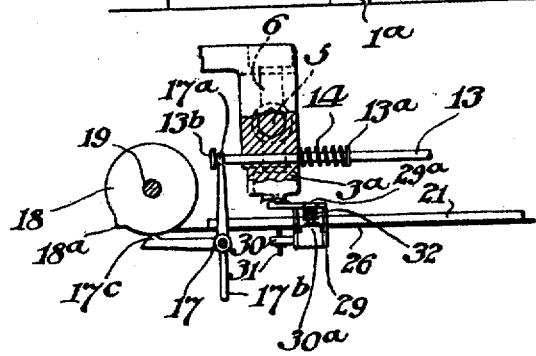

In the drawings, Figure 1 is a top plan view of a testing machine embodying my improvements; Fig. 2 is a front elevation of the same; Fig. 3 is a sectional view taken on the line 3—3 of Fig. 2; and Fig. 4 is a sectional view taken on the line 4—4 of Fig. 3.

The machine embodying my invention, in the form thereof illustrated in the drawings, comprises a base 1 having means $1^a$ for fixing it to any suitable support and a movable cross-bar $1^b$ providing an anvil for supporting an object 2 to be tested. A bifurcated standard 3 is supported adjustably on the block, to which it is fixed by the bolts 4 having heads movable in the under-cut channels $1^c$.

An arm 5 is fixed at its inner end to an arbor 6 having journals $6^a$ which are mounted in the anti-friction bearings 7 carried by the upper parts of the standard's bifurcations. The arm has fixed to its outer end a striker 8 provided at its opposite ends with a conical point $8^a$ and a button $8^b$, the point being designed for impinging upon tires and the button for engaging the arm in the elevated position, from which it falls initially to cause the impact of the striker upon the tire.

An arm 9 is fixed at its inner end to the top of the standard 3 and has at its outer end a fulcrum $9^a$ on which is mounted a lever 10. This lever is held adjustably by the bolt 11 set in the arm 9 and the nut $11^a$ threaded thereon and having a swiveled connection with the bifurcation $10^a$ of the lever.

A trigger 12 is pivotally connected with the lever 10 by the pintle $10^b$ and to a rod 13 by a pintle $12^a$, the trigger having a lug $12^b$ which is adapted for engaging the button $8^b$ to hold the arm 5 and striker 8 in the elevated position. The rod 13 extends through and is adapted to play in a bearing $3^a$ in the upper part of the standard 3 and is provided with flanges $13^a$ and $13^b$ on opposite sides of the standard. A coiled spring 14 is disposed on the rod 13 between the standard 3 and flange $13^a$, whereby the rod acts on the trigger to hold it in position for engaging the button $8^b$.

A bent arm 16 is fixed at its inner end to the top of the standard 3 and a stud $16^a$ thereon provides a fulcrum for a three-armed lever 17, the latter comprising a bifurcated arm or yoke $17^a$ for engaging the flange $13^b$ to retract the rod 13 and trigger 12, the handle $17^b$ for manually operating the lever, and the cammed arm $17^c$ for effecting the automatic operation of the lever.

The automatic operation of the lever 17 is effected by a revoluble disk 18 against the periphery of which the arm $17^c$ is held by the spring 14, acting through the rod 13 on the lever 17, the disk being provided with a peripheral cam $18^a$ which acts on the contacting arm to operate the lever.

The disk 18 is fixed on a shaft 19 which is journaled in the bearings 20 carried at an end of a table 21 by the standard 3, the shaft having fixed thereon between the bearings the spool or roller 21', and the spur wheel 22. A pinion 23, fixed on a revoluble shaft 24, engages and drives the wheel 22, the shaft being revolved by a usual form of spring motor 25 having a winding handle $25^a$, a speed governor $25^b$, and a braking mechanism $25^c$ controlled by the handle $25^d$.

The roller 21' revolved by the motor through the intermediate mechanism described, winds thereon the paper 26, which is drawn thereby over the table 21, from a roller 27 journaled in bearings 28 at an end of the table 21 opposite the bearings 20, the roller 27 being provided with a handle 27ª for winding paper thereon.

A bifurcated bracket 29 is fixed to the arbor 6 and an arm 30 is connected to the bracket by the pivot 29ª. This arm carries a pen or pencil 31, which makes contact with the paper 26 on the table 21, and is acted upon by a spring 32 bearing against seats 29ª and 30ª of the bracket and arm respectively. It will be understood that this arrangement provides for firm and mobile action of the marker 31 with relation to the paper, while permitting the arm to be elevated or swung out of the way of the paper when this is desired.

In starting the device, the disk 18 is positioned so that its cam 18ª must move through a substantial arc before tripping the lever 17, so that the motor 25 shall have had time to attain its normal speed and move the paper over the table 21 at the desired rate, by the mechanism described. When the cam 18ª engages the cam of the arm 17ᶜ, the lever 17 is rocked and its arm 17ª draws back the rod 13 and trigger 12, disengaging the latter from the button 8ᵇ and permitting the arm 5 and striker 8 to fall. The point 8ª of the striker impinges upon the tire 2 at the end of its movement by gravity through approximately 90 degrees, or the movement of the arm 5 from an approximately horizontal to an approximately vertical position. The impact of the striker against the tire 2 marks the latter with a circle or other mark having an area depending upon the hardness of the rubber or material composing the tire and the character of the striker. The rebound of the arm 5 and striker, as also the number and distances of the succeeding oscillations due to impact and rebound, will, through the marker 31, make a record D on the paper depending on the resiliency of the material of the tire.

As the hand or arm 30 and arm 5 are fixed to the same arbor 6, the marker carried by the arm 30 will oscillate through arcs proportionate to those of the striker 8, the marker recording or charting its oscillations on the traveling paper 26. Charts thus formed by testing different tires provide convenient graphic representations of the characteristics of such tires, which can be preserved in such graphic forms and readily compared.

Having described my invention, I claim:

1. In a testing machine, a gravity operated striking device, an indicating device connected with said striking device so as to move through distances bearing a definite relation to the movements of said striking device, means for holding said striking device in elevated position, means for tripping said means first named so as to release said striking device, recording means, and mechanism connecting said tripping and recording means whereby they are operated in coordinated relation.

2. In a testing machine, an oscillatory arm provided with a striking device, an oscillatory indicating device connected to said arm so that their arcs of oscillation shall be the same, a trigger for holding said arm in elevated position from which it is adapted to fall by gravity when released, a motor, and means operated by said motor tripping said trigger and releasing said arm.

3. In a testing machine, an oscillatory arm provided with a striking device, means for holding said arm in an elevated position, an oscillatory arm provided with a marking device, means for connecting said arms so that they oscillate together, a support for a material to be operated on by said marking device, and means comprising a motor for carrying said material over said support and releasing said first named arm.

4. In a testing machine, an oscillatory arm provided with a striking device, an oscillatory arm provided with a marking device, means for connecting said arms so that they oscillate together, means for holding said striking device in elevated position, means for carrying paper parallel to the path of said marker, a motor, and mechanism whereby said motor effects the release of said striking device and the movement of said paper.

5. In a testing machine, an oscillatory arm provided with a striking device, a trigger for holding said arm in elevated position, a rod for operating said trigger to disengage said arm, a revoluble cam, means operated by said cam for operating said rod, a motor for revolving said cam, means for carrying a sheet of material adapted for receiving a record, means whereby said motor operates said means second named, and an oscillatory arm provided with a marker adapted for making a record on said sheet, said arms being connected so as to oscillate together.

6. In a testing machine, a frame having means for holding an article to be tested, means journaled in said frame for striking said article, a table carried by said frame, means connected with said means first named for making a record, rollers for carrying paper across said table for receiving said record, means for holding said means first named in elevated position, a motor, and means whereby said motor releases said means first named and operates a roller aforesaid.

7. In a testing machine, a frame provided with a base, means connected with said base for holding an article to be tested, a standard adjustable on said base and an arm fixed to said standard, in combination with an arbor journaled in said standard, an arm provided with a striking device fixed to said arbor, means whereby said arm first named supports said arm second named, means for releasing said arm second named, and an indicating device connected to said arbor.

8. In a testing machine, the combination with a frame, of an arbor journaled therein, an arm provided with a striking device connected to said arbor, a lever adjustably mounted on said frame, a trigger pivotally connected with said lever for supporting said arm with the striking device thereon, a reciprocating rod connected with said trigger, a spring for acting on said rod to hold said trigger in engaging position, a lever for operating said rod to withdraw said trigger from engaging position, and means for moving a sheet of paper in position to be operated on by said marker.

9. In a testing machine, the combination with a frame having a base, a work support connected with said base, and a standard adjustable on said base, in combination with a table carried by said standard, a pair of rolls for carrying paper across said table, a motor for revolving one of said rolls, an arbor journaled in said standard, an oscillatory striking device carried by said arbor, and an oscillatory marking device carried by said arbor and adapted to record the actions of said striking device on paper carried across said table by said rollers.

In testimony whereof I have hereunto set my name this 11th day of Oct., 1916.

TRACY V. BUCKWALTER.